US006932275B2

(12) United States Patent
Mambakkam et al.

(10) Patent No.: US 6,932,275 B2
(45) Date of Patent: Aug. 23, 2005

(54) FRAME KIT TO ACCOMMODATE MULTIPLE HOST PROCESSING SYSTEM CONNECTOR INTERFACES

(75) Inventors: Sreenath Mambakkam, San Jose, CA (US); Arockiyaswamy Venkidu, Menlo Park, CA (US); Larry Lawson Jones, Palo Alto, CA (US); Simaly Phoukong, Stockton, CA (US)

(73) Assignee: Onspec Electronic Inc., Santa Clara, CA (US)

( * ) Notice: Subject to any disclaimer, the term of this patent is extended or adjusted under 35 U.S.C. 154(b) by 407 days.

(21) Appl. No.: 10/065,325

(22) Filed: Oct. 3, 2002

(65) Prior Publication Data

US 2004/0182919 A1 Sep. 23, 2004

(51) Int. Cl.[7] ................................................ G06K 7/00

(52) U.S. Cl. ....................... 235/486; 235/484; 235/485; 235/483; 235/492; 439/475; 439/630

(58) Field of Search ................................ 235/375, 380, 235/379, 435, 483, 486, 484, 492; 439/475, 630; 710/301; 361/737, 728–731, 733, 740–742, 747–748, 756–759, 801–802, 809–810, 683, 684, 686; 29/566.2–566.4, 762, 764, 739–741, 748, 835, 830, 832, 837, 854, 827

(56) References Cited

U.S. PATENT DOCUMENTS 4,551,912 A * 11/1985 Marks et al. ................. 29/827
4,801,561 A * 1/1989 Sankhagowit ................ 29/827
6,381,662 B1 * 4/2002 Harari et al. ............... 710/301
6,386,920 B1 * 5/2002 Sun ............................ 439/630
6,628,524 B1 * 9/2003 Washino et al. ............ 361/737
6,641,413 B2 * 11/2003 Kuroda ........................ 439/159
6,699,053 B2 * 3/2004 Kuroda ........................ 439/218
6,738,259 B2 * 5/2004 Le et al. ...................... 361/737
6,806,559 B2 * 10/2004 Gann et al. ................. 257/672
6,857,907 B1 * 2/2005 Hung et al. ................. 439/630
2003/0095386 A1 * 5/2003 Le et al. ..................... 361/737
2004/0060988 A1 * 4/2004 Sakamoto et al. .......... 235/492
2004/0106326 A1 * 6/2004 Hsieh .......................... 439/630
2004/0110423 A1 * 6/2004 Shishikura et al. ......... 439/630
2005/0026505 A1 * 2/2005 Washino ...................... 439/630

* cited by examiner

*Primary Examiner*—Karl D. Frech
*Assistant Examiner*—Daniel Walsh
(74) *Attorney, Agent, or Firm*—Blakely Sokoloff Taylor & Zafman LLP

(57) ABSTRACT

An embodiment of the invention provides a connector interface frame comprising a plurality of detachable limbs. When one or more specified limbs are detached, the connector interface frame accommodates a particular one of a plurality of host processing system connector interfaces. Depending on which limbs are detached, the frame can accommodate either a CF card or a PCMCIA card. In alternative embodiments, the frame accommodates other host processing system connector interfaces. Embodiments of the invention, therefore, allow a production run that allow the production of a standard frame kit that can be used for multiple types of host processing system connector interfaces.

20 Claims, 5 Drawing Sheets

FRAME KIT TO ACCOMMODATE MULTIPLE HOST PROCESSING SYSTEM CONNECTOR INTERFACES

BACKGROUND OF INVENTION

1. Field

Embodiments of the invention relate generally to the field of flash media adapters, and more specifically to a device and method for reducing the manufacturing costs thereof.

2. Background

Adapters, such as those as described in co-pending U.S. application Ser. No. 10/064,966, which was filed on Sep. 4, 2002, entitled "SmartConnect Universal Flash Media Card Adapters" are capable of interfacing one or more different types of flash media cards to another flash media receptacle, such as a CompactFlash or PCMCIA slot in a host processing system. This allows other media to be interfaced and serviced as well. Such other media could include a new P-Tag (Personal Tag for Military Use) device known to the inventor, SmartMedia(tm) ("SM"), Memory Stick(tm) by Sony ("MS"), Secure Digital(tm) ("SD"), and MultiMediaCard™ ("MMC"), or any other media having a form factor capable of fitting within an adapter housing built to the receptacle mechanical specifications such as the Memory Stick Duo from Sony or XD Picture Card from Fuji, Olympus and Toshiba.

The problem is that each adapter type requires a separate frame kit. Although the number of frame kits can be reduced for multi-port adapters if on their port side the port opening is done in accordance with the disclosure of the above-referenced co-pending application. The host processing system interface may be one of at least two different formats, namely a CompactFlash card (CF card), or a Personal Computer Memory Card International Association (PCMCIA card).

FIG. 1A illustrates a frame kit to accommodate a PCMCIA card in accordance with the prior art. Frame kit 100A, shown in FIG. 1A, has a multi-port opening 101A to accommodate multiple flash media interfaces on one end, and an opening 111A to accommodate a PCMCIA card host processing system interface on the other end. The PCMCIA connector is symbolized as outline 110A. Bridge 102A is typically included to avoid breaking off tails (limbs) during manufacturing.

FIG. 1B illustrates a frame kit to accommodate a CF card in accordance with the prior art. Frame kit 100B, shown in FIG. 1B, has a multi-port opening 101B to accommodate multiple flash media interfaces on one end, and an opening 111B to accommodate a CF card host processing system interface on the other end. The CF connector is symbolized as outline 110B and a bridge 102B is included to avoid breaking off tails during manufacturing. The frame kit 100B may be configured to accommodate various CF cards, a narrow outline, shown in FIG. 2, or a broad outline that permits a slightly larger PCB, indicated by dashed lines 101B.

A major drawback of having different frame configurations for each type of host processing system interface is in the area of manufacturing and tooling. In general, tooling costs depend on the non-recurring engineering (NRE) costs and the lifetime of the tool (number of times it can be pressed before replacement is necessary). For the manufacturing of flash memory media adapters, such tooling costs may be significant. For example, at manufacturing, switching production from one type of frame (e.g., PCMCIA card) to another (e.g., CF card) may occur as frequently as every day or two, at which point "NRE cost" becomes somewhat of a misnomer.

An additional drawback of current flash memory adapters is that they do not provide a mechanism for easily determining an insertion problem such as pin-contact failure or improper insertion of the flash memory medium (e.g., upside down).

SUMMARY OF INVENTION

An embodiment of the invention provides a connector interface frame comprising a plurality of detachable limbs. When one or more specified limbs are detached, the connector interface frame accommodates a particular one of a plurality of host processing system connector interfaces.

Other features and advantages of embodiments of the present invention will be apparent from the accompanying drawings, and from the detailed description, that follows below.

BRIEF DESCRIPTION OF DRAWINGS

The invention may be best understood by referring to the following description and accompanying drawings that are used to illustrate embodiments of the invention. In the drawings.

DETAILED DESCRIPTION

An embodiment of the invention provides a frame for a host processing system connector interface. The frame has a number of detachable limbs configured so that depending on which limbs are detached, the frame is able to receive (can accommodate) either a CF card or a PCMCIA card. In alternative embodiments, the frame accommodates other host processing system connector interfaces. Embodiments of the invention, therefore, allow a production run that allow the production of a standard frame kit that can be used for multiple types of host processing system connector interfaces.

In the following description, numerous specific details are set forth. However, it is understood that embodiments of the invention may be practiced without these specific details. In other instances, well-known structures and techniques have not been shown in detail. Reference throughout the specification to "one embodiment" or "an embodiment" means that a particular feature, structure, or characteristic described in connection with the embodiment is included in at least one embodiment of the present invention. Thus, the appearance of the phrases "in one embodiment" or "in an embodiment" in various places throughout the specification are not necessarily all referring to the same embodiment.

Furthermore, the particular features, structures, or characteristics may be combined in any suitable manner in one or more embodiments.

Similarly, it should be appreciated that in the foregoing description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Figure 2:
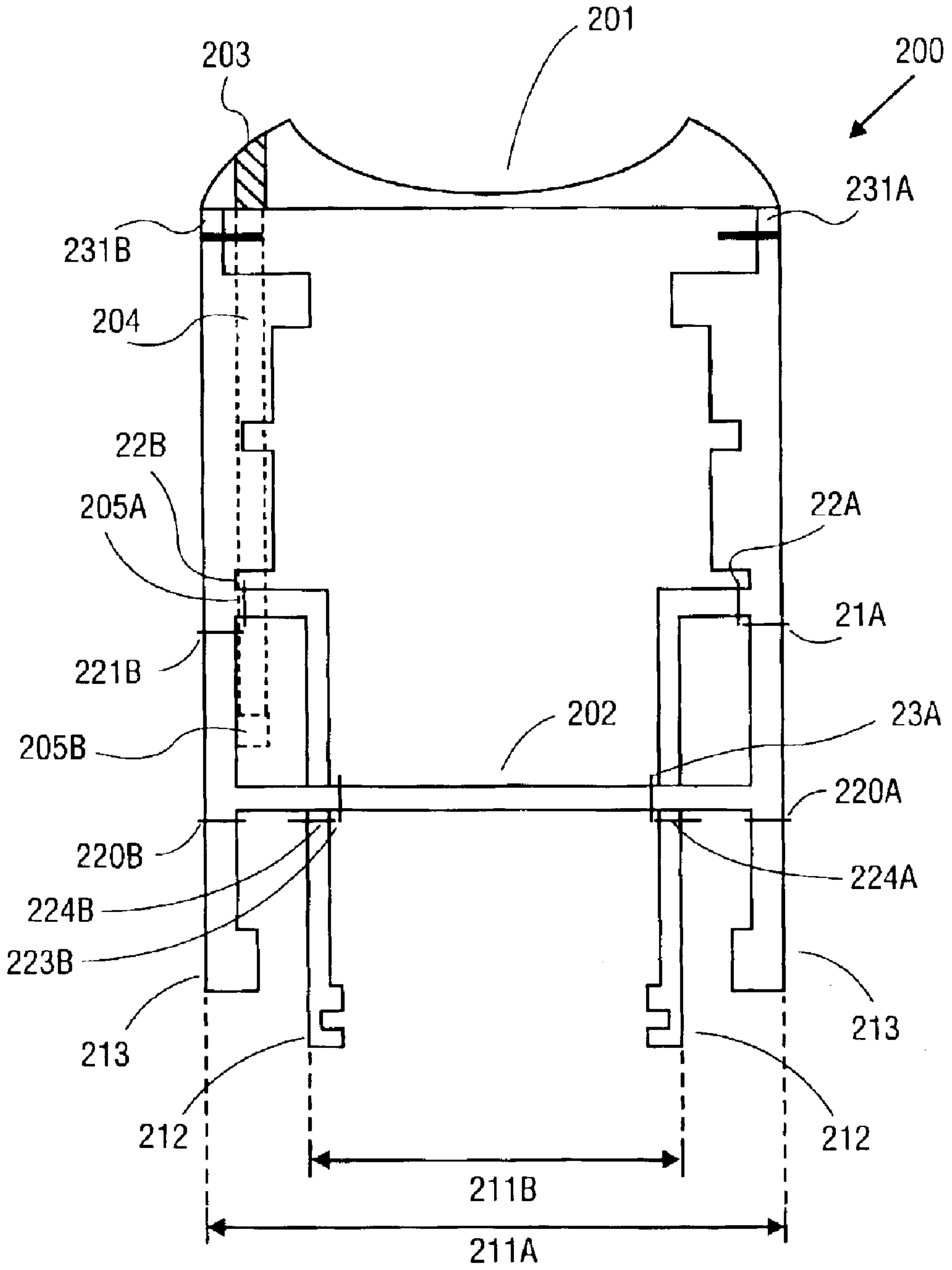
FIG. 2 illustrates a combination frame in accordance with one embodiment of the invention.

FIG. 2 illustrates a combination frame in accordance with one embodiment of the present invention. Frame kit 200, shown in FIG. 2, has a standard port opening 201, but now it has two frames set in different height positions for the PCMCIA card opening 211A and the CF card opening 211B. Limbs 212 are used in conjunction with a CF card, and limbs 213 are used in conjunction with a PCMCIA card. The centered placement of the CF extension (limbs 212), as depicted in the drawings, is optional, and this extension could be aligned anywhere within internal frame opening, such as to the left or right.

Figure 1A:
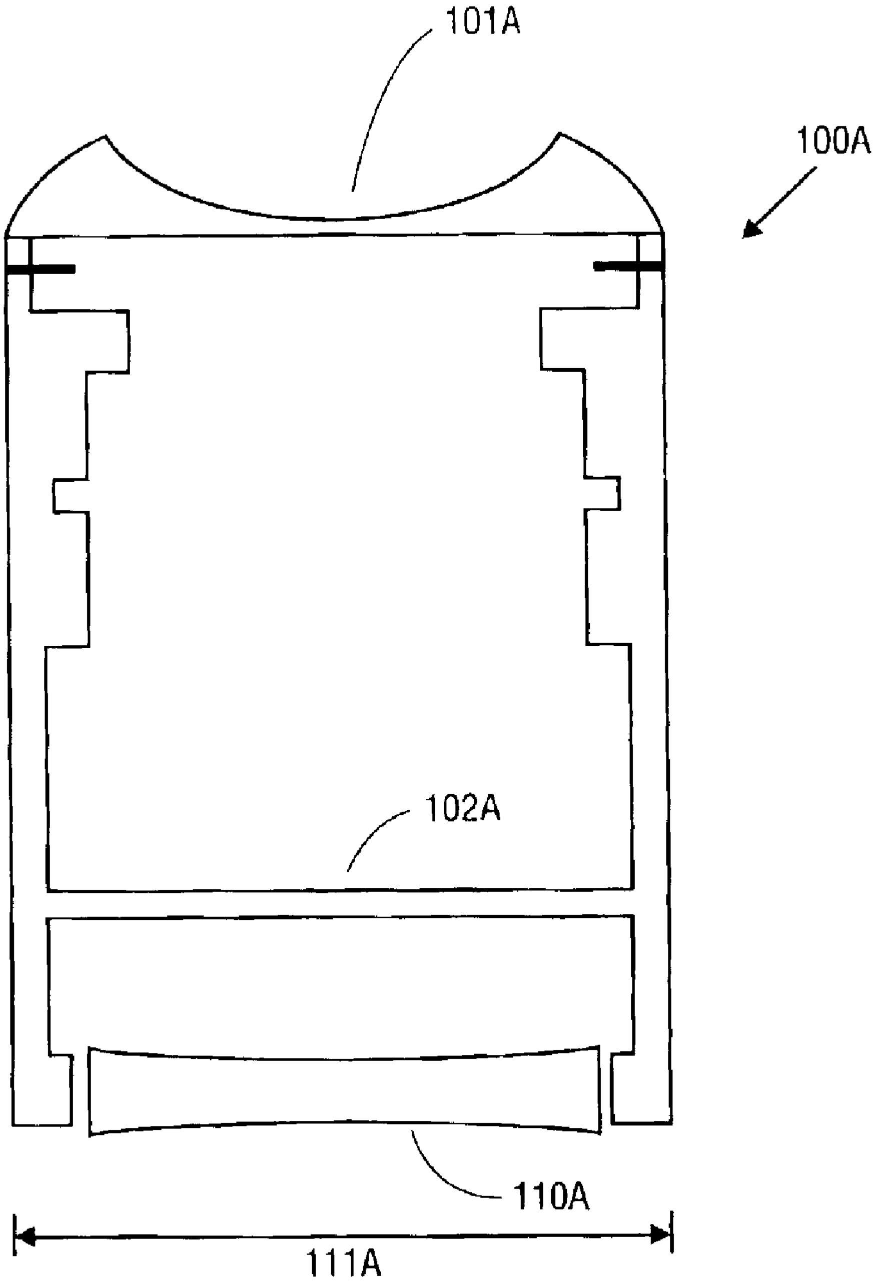
FIG. 1A illustrates a frame kit to accommodate a PCMCIA card in accordance with the prior art.
Figure 1B:
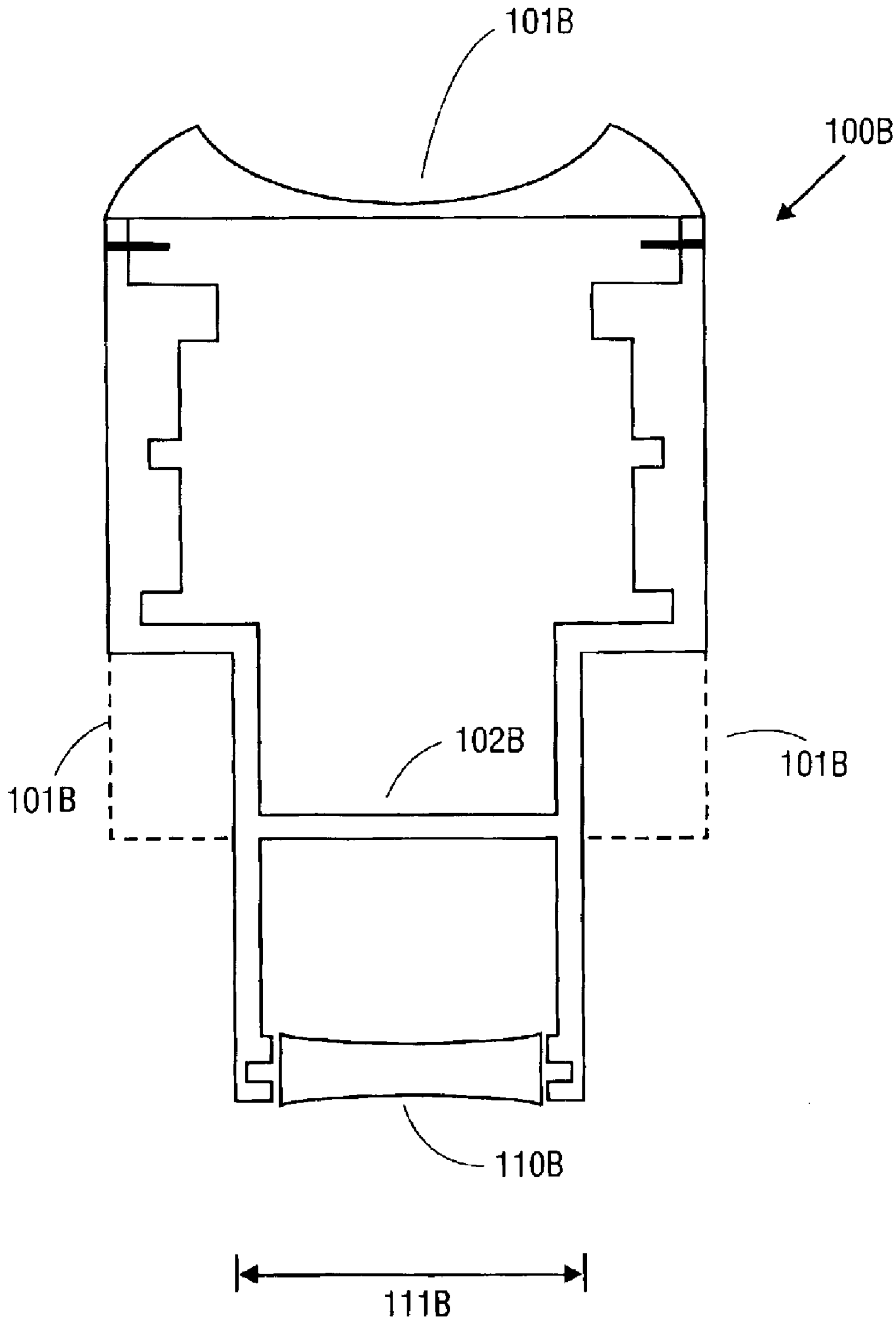
FIG. 1B illustrates a frame kit to accommodate a CF card in accordance with the prior art.

Depending on the outline that needs to be achieved, cuts can be performed at several locations, such as 220*a* and 220*b*, 221*a* and 221*b*, 222*a* and 222*b*, 223*a* and 223*b*, and 224*a* and 224*b*, resulting in a variety of slightly different frames that essentially approximate the conventional frames described in reference to FIGS. 1A and 1B.

Additionally, ground pins 231*a* and 231*b* are embedded, and an opening for light pipe 203 is provided. Light pipe 204 and two potential locations for a signal lamp (e.g., an LED) are provided as well, namely 205*a* and 205*b*. The location of the signal lamp is dependent on the form factor chosen and the PCB available. In an alternative embodiment, light pipe opening 203 and light pipe 204 could be located on the other side of the frame kit.

Alternatively, the entire frame kit could be illuminated by use of translucent plastic for the frame kit, or the light pipe might be on the outside of the frame, forming sort of an exterior rail.

Figure 3:
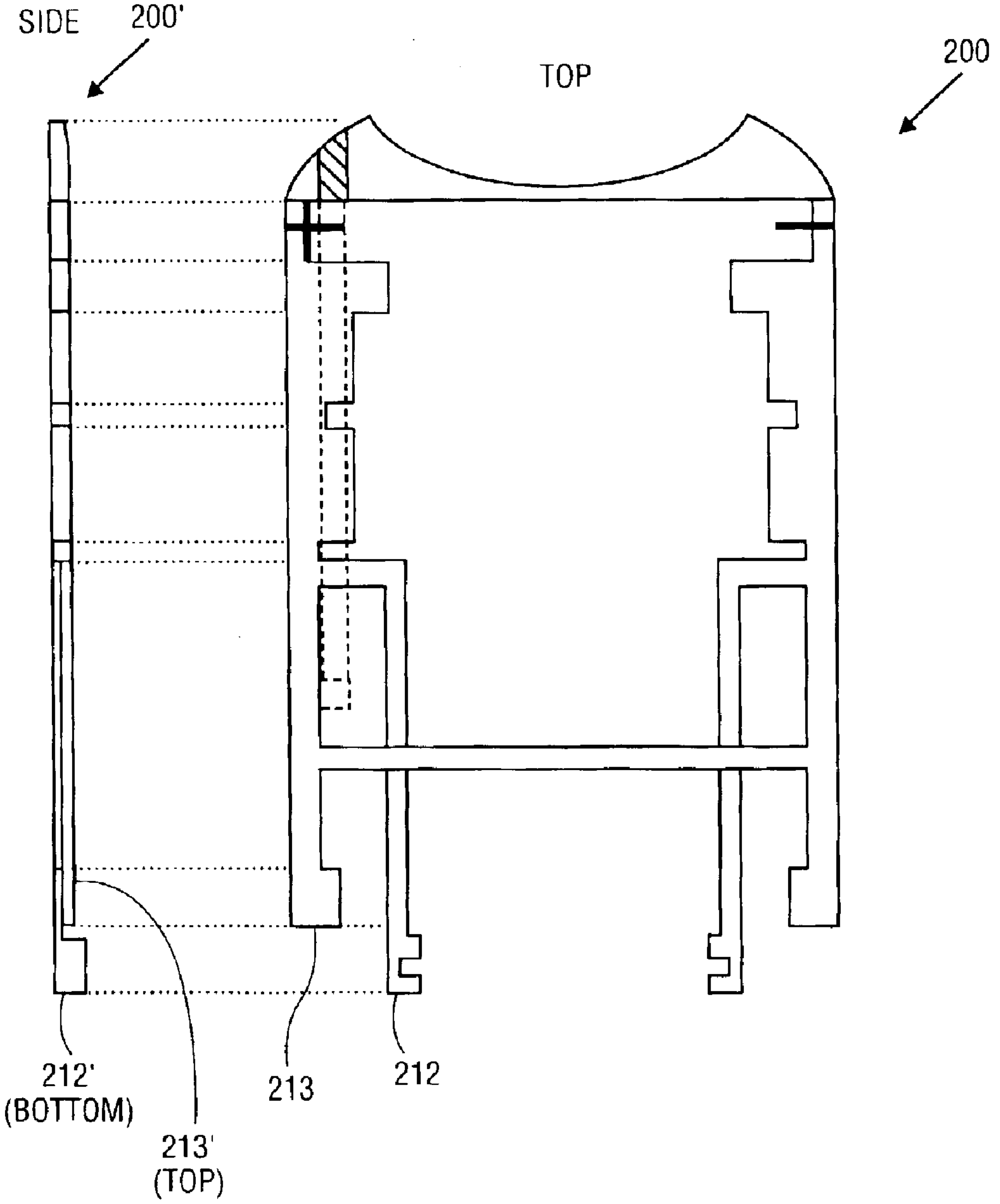
FIG. 3 illustrates a combination frame, in a top view and side view, in accordance with one embodiment of the invention.

FIG. 3 illustrates combination frame 200 in a top view and side view for clarity in accordance with one embodiment of the invention. Side view 200' shows limbs 212' and 213' in slightly different height approximations. However, the ends of limbs 212 and 213 must be full sized, so they are interleaved, as shown in FIG. 3. Because they are spatially separate, they can occupy the full height at the end position. The only form factor difference that needs individual treatment is that each form factor, depending on the cuts performed, requires a different metal or plastic cover to match the outline of the chosen form. To allow the use of controller-less media types, controller ICs, such as those described in co-pending U.S. application Ser. No. 09/683,919, filed on Jun. 4, 2002, and entitled "Multimode Controller for intelligent and "Dumb" Flash Cards", could be used.

Figure 4:
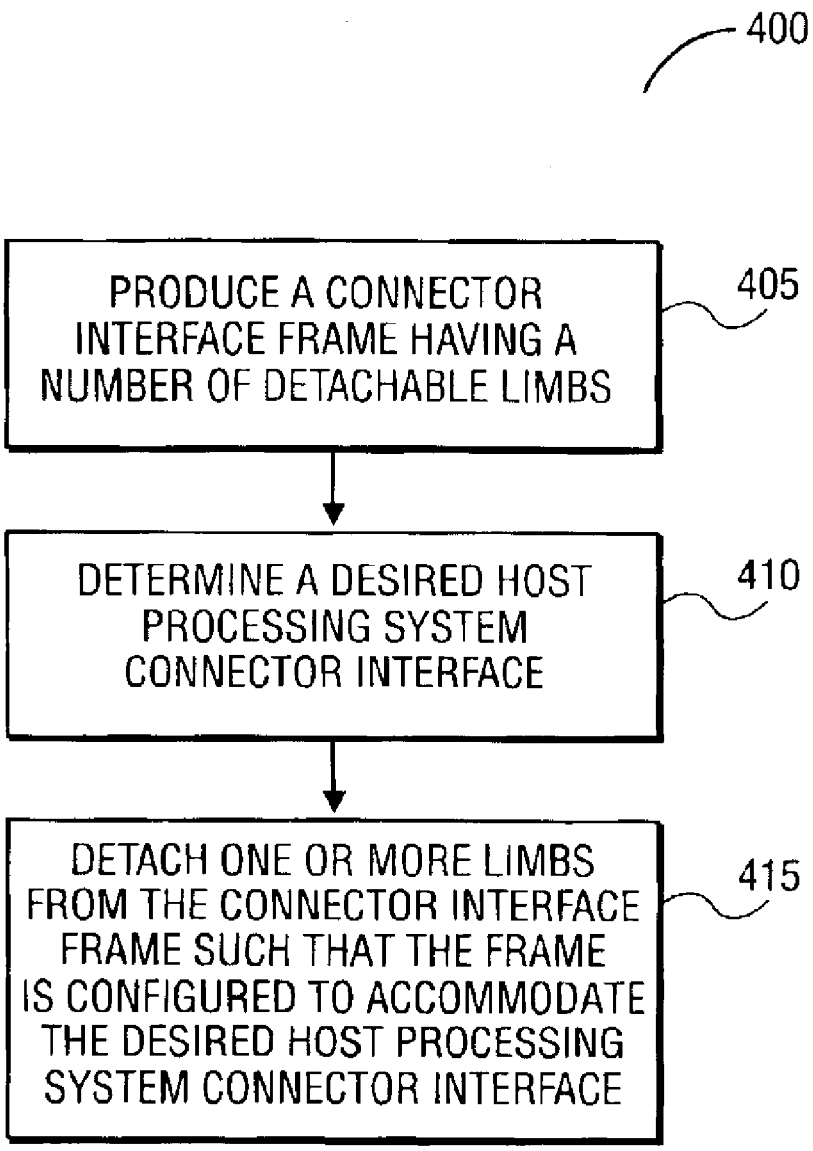
FIG. 4 illustrates a process by which a frame, configured for a desired host processing system connector interface, is provided in accordance with one embodiment of the invention.

FIG. 4 illustrates a process by which a frame, configured for a desired host processing system connector interface, is provided in accordance with one embodiment of the invention. Process 400, shown in FIG. 4, begins at operation 405 in which a connector interface frame is produced. The frame has a number of limbs that can be detached. When specific limbs are detached, the remaining limbs provide a connector interface frame that accommodates a specific host processing system connector interface (e.g., PCMCIA). If other limbs are detached, the remaining limbs provide a connector interface frame that accommodates a different host processing system connector interface (e.g., CF). For one embodiment the frame is manufactured using one mold with only one cavity. In alternative embodiments, more than one mold and/or additional cavities are used, such as for a multi-port to CF frame kit or multi-port to PCMCIA frame kit. Also, dedicated single port frame kits can be made, that can plug into either CF or PCMCIA card slots. For one embodiment, the internal mechanical structure of the frame embodiment is designed to mount to a particular brand of multi-port media connector, however, it could be modified to fit anyone or more media connectors, as desired.

At operation 410, a manufacture determines a desired host processing system connector interface (e.g., PCMCIA or CF) from among those which the frame can accommodate.

At operation 415, one or more specific limbs are detached from the frame such that the remaining limbs provide a frame that accommodates the desired host processing system connector interface. For one embodiment, the limbs are made of plastic approximately 1 mm thick, and can therefore be easily detached by a cutting process during manufacturing. Alternatively, or additionally the limbs may be perforated to facilitate cutting. For one embodiment, the limbs are detached through an automated process.

While the invention has been described in terms of several embodiments, those skilled in the art will recognize that the invention is not limited to the embodiments described, but can be practiced with modification and alteration within the spirit and scope of the appended claims. The description is thus to be regarded as illustrative instead of limiting.

What is claimed is:

1. An apparatus comprising:

a plurality of limbs attached to a connector interface frame of a memory card adaptor, the limbs detachable, such that upon the detachment of one or more specified limbs, the connector interface frame accommodates a particular one of a plurality of host processing system connector interfaces.

2. The apparatus of claim 1 in which the plurality of host processing system connector interfaces includes CF and PCMCIA interfaces.

3. The apparatus of claim 1 wherein the plurality of detachable limbs are formed from plastic.

4. The apparatus of claim 1 wherein the plurality of detachable limbs are approximately 1 mm thick.

5. The apparatus of claim 1 wherein the plurality of detachable limbs are perforated to facilitate detachment.

6. The multi-media adaptor of claim 1 further comprising:

a signal lamp; and a light pipe to channel light from the signal lamp to a port adjacent to the memory media interface.

7. A method comprising:

producing a connector interface frame of a memory card adaptor, the connector interface frame having a plurality of detachable limbs such that upon the detachment of one or more specified limbs, the connector interface frame accommodates a particular one of a plurality of host processing system connector interfaces;

determining a desired host processing system connector interface from the plurality of host processing system connector interfaces; and detaching one or more of the plurality of detachable limbs from the connector interface frame such that the frame is configured to accommodate the desired host processing system connector interface.

8. The method of claim 7 in which the plurality of host processing system connector interfaces includes CF and PCMCIA interfaces.

9. The method of claim 7 wherein the plurality of detachable limbs are formed from plastic.

10. The method of claim 7 wherein the plurality of detachable limbs are approximately 1 mm thick.

11. The method of claim 7 wherein the plurality of detachable limbs are perforated to facilitate detachment.

12. The method of claim 7 wherein detaching one or more of the plurality of detachable limbs from the connector interface frame is done automatically.

13. A multi-memory media adapter comprising:

a memory media interface;

a particular host processing system connector interface selected from a plurality of host processing system connector interfaces; and a connector interface frame, the connector interface frame having one or more remaining limbs, the remaining limbs a subset of a plurality of detachable limbs such that upon the detachment of one or more specified limbs of the plurality of detachable limbs, the remaining limbs accommodate the particular host processing system connector interface of the plurality of host processing system connector interfaces.

14. The multi-memory media adapter of claim 13 in which the plurality of host processing multi-memory media adapter connector interfaces includes CF and PCMCIA interfaces.

15. The multi-memory media adapter of claim 13 wherein the plurality of detachable limbs are formed from plastic.

16. The multi-memory media adapter of claim 13 wherein the plurality of detachable limbs are approximately 1 mm thick.

17. The multi-memory media adapter of claim 13 wherein the plurality of detachable limbs are perforated to facilitate detachment.

18. The multi-memory media adapter of claim 13 further comprising:

an active component.

19. The multi-memory media adapter of claim 13 wherein the signal lamp is a light-emitting diode.

20. The multi-memory media adapter of claim 13 wherein the memory media interface is capable of receiving a memory media card selected from the group consisting of SmartMedia card, MultiMedia card, Secure Digital card, Memory Stick, and a flash media having a similar form factor.

* * * * *